UNITED STATES PATENT OFFICE.

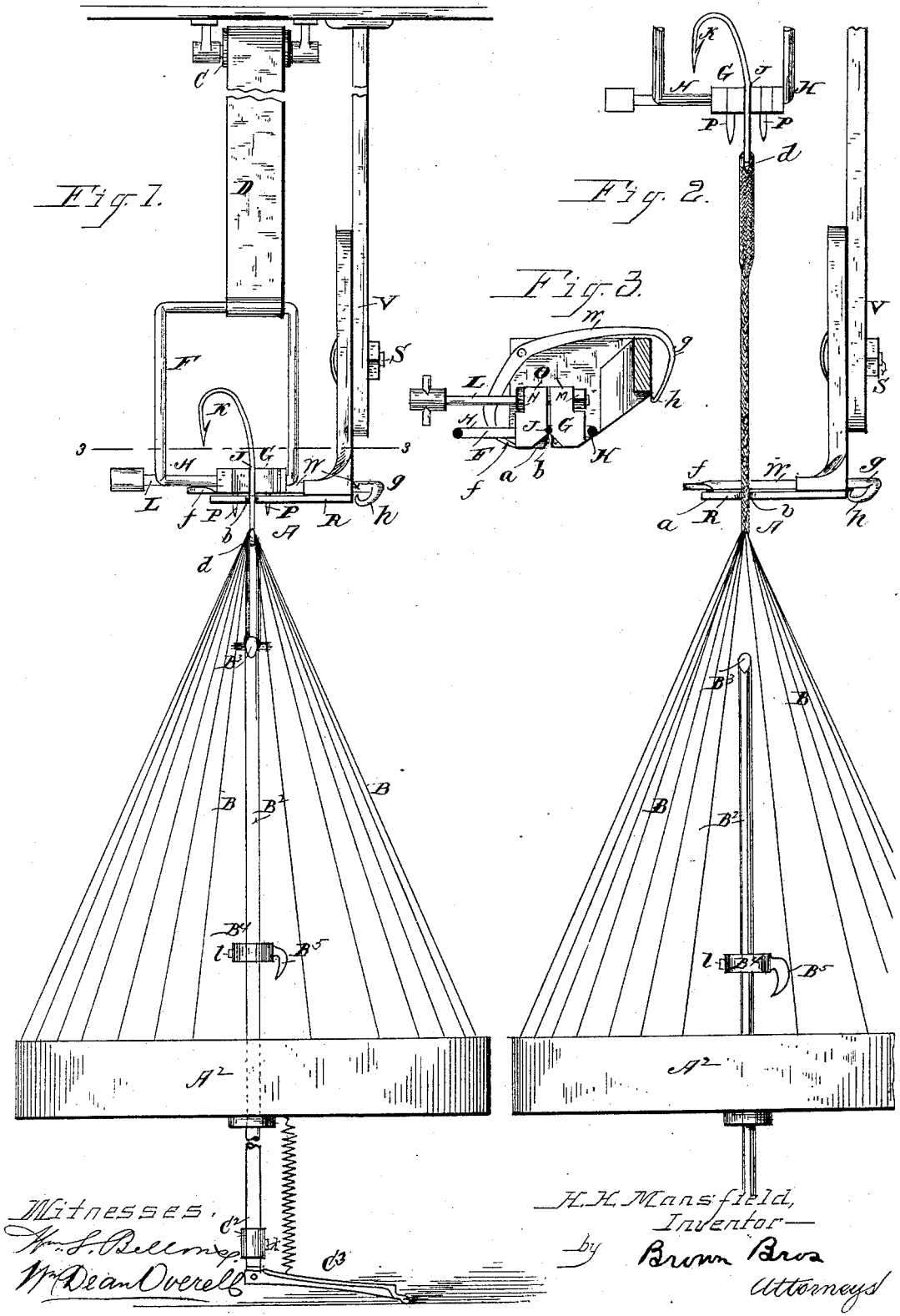

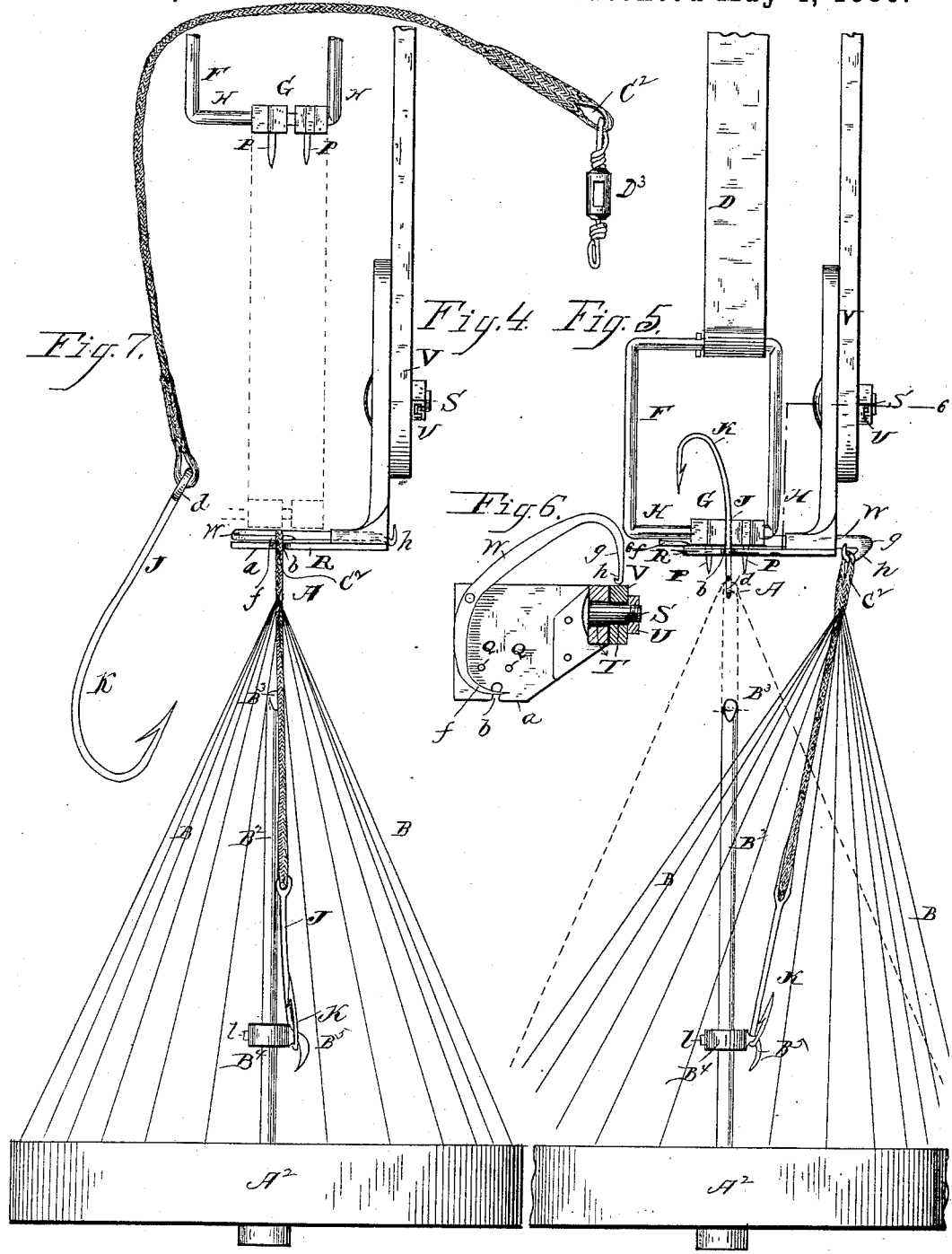

HORACE H. MANSFIELD, OF CANTON, MASSACHUSETTS.

GANGE OR SNOOD FOR FISH-HOOKS AND OTHER PURPOSES.

SPECIFICATION forming part of Letters Patent No. 341,257, dated May 4, 1886.

Application filed May 27, 1885. Serial No. 166,886. (No model.)

*To all whom it may concern:*

Be it known that I, HORACE H. MANSFIELD, of Canton, in the county of Norfolk and State of Massachusetts, have invented certain new and useful Improvements in Ganges or Snoods for Fish-Hooks and other Purposes, of which the following is a full, clear, and exact description.

This improved snood or gange is a braided one, and the method of its production, which is to constitute the subject-matter of another application for Letters Patent, is as follows: First, the several strands which are to compose the braided snood or gange are doubled over, and the so doubled-over portion secured or held, and as so secured braided about and along the length and beyond the same till the desired length of line for the snood or gange is thus secured, when the braided strands are then doubled over and the unbraided strands in continuation thereof are braided around them sufficiently to connect them therewith, the whole producing a length of braided strands having at each end a loop, the one loop to receive a fish-hook and the other to make the attachment of the gange or snood to the fish-line. The production of this snood or gange can be accomplished by hand or machine, and one form and arrangement or mechanism therefor, which is to constitute another application for Letters Patent, and is only embraced herein for a more intelligible understanding, is in substance as follows: First, a clamp suitable to clamp the fish-hook which is to have a gange or snood applied to it and connected to and suspended from the take-up mechanism of a braiding-machine; second, of a stationary but vertically adjustable platform to support said clamp, and which has a slitted opening in it to receive the shank or stem of the hook, and is adapted to receive and steady said clamping device in the beginning of the operation of braiding; third, of a rest or bridge which is capable of being swung into position for a doubling of the braided line over it when the same becomes necessary, and placed out of said position; fourth, of a vertical rod which is centrally and axially located in the braiding-machine and has a hook both at its upper end and also on its side, the side hook being adjustable vertically upon the rod and the rod attached to and also adjustable vertically on a treadle; and fifth, of a hook upon which to hang a completed braided gange or snood, all substantially as and for operations substantially as hereinafter described.

In the accompanying plates of drawings, forming a part of this specification, Figure 1 is a front view of the mechanism above referred to, showing the same and a fish-hook and strands of the braiding mechanism as in position for the braiding of a gange or snood to begin. Fig. 2 is a similar view to Fig. 1, but showing said mechanism and fish-hook in their position with the length of gange or snood braided and just in position for the so-braided gange to be doubled over to complete the making of the same. Fig. 3 is a horizontal section on line 3 3, Fig. 1. Fig. 4 is a similar view to Fig. 2, but showing the braided gange as doubled over and secured and the gange as completed. Fig. 5 is a similar view to Fig. 1, but showing a completed gange as set to one side for its strands to be severed and placed through the eye of the hook to be next ganged and which is secured in the clamp therefor. Fig. 6 is a horizontal section on line 6 6, Fig. 5. Fig. 7 is a view of the gange or snood complete with the fish-hook and a swivel-eye attached.

The location of the braiding-machine is indicated at $A^2$, and as the braiding-machine and its take-up can be of any of the ordinary forms of construction and arrangement it is not deemed necessary to herein describe or illustrate them.

A is the braiding-point of a braiding-machine, and B the several strands which are to be braided, all meeting at said braiding-point A, and each running from a separate spool of the braiding-machine, all as usual.

C is the take-up roller or pulley of the take-up mechanism. This pulley C is located above the braiding-point A, and it is arranged, as usual, to act as a take-up in the operation of the braiding-machine.

D is a band, preferably made of thin or flexible sheet metal, and at one end secured to the periphery of the take-up pulley C, and at the other end carrying a stirrup-shaped frame, F, which is suspened from and free to turn upon it.

G is a clamp composed of two jaws, each carried by a leg, H, of the stirrup F, and adapted to clamp the stem or shank J of the fish-hook K between them, and to be opened therefrom and closed thereon, the construction for this purpose consisting of a screw-operating rod, L, with a screw-nut, M, and collar N, and passing loosely through the heel ends O of the jaws of the clamp, Fig. 3.

P P are dowel-pins projecting from the under side of the clamp-jaws. These pins P enter into sockets Q, suitably located therefor, of a horizontal platform, R. This platform is attached by a screw-bolt, S, passing through its vertical slot T, and by a screw-nut, U, to the upright face of a fixed standard, V, which is located at one side of the braiding-machine. This platform R has in its front edge, $a$, a slotted opening, $b$, of suitable shape for the shank or stem of the fish-hook K to be placed through it and in and between the clamp-jaws G, and so placed have the eye $d$ of the hook below the platform, and located at the braiding-point A, the dowel-pins P of the clamp-jaws being then in the holes Q of said platform. The platform R is vertically adjustable on the supporting-standard, to which it is attached, as described.

W is a horizontal arm arranged to swing upon a stud as a center, that is fixed and projects from the upper side of the platform R. One end, $f$, of this arm W is shaped so that when the arm is properly swung therefor it will make a bridge across the slitted opening $b$ of the platform, and in front of the braided line, which extends upward through it in the operation of braiding, and the bridging end, $f$, is relatively situated so that, with the braiding end in front of the braided line, the other or hook end is back and out of the way, and with said hook end $h$ at the front of the platform the bridging end is away from the bridged line.

$B^2$ is a vertical rod located in the central and vertical axis of the braiding-machine and in a line coincident with the braiding-point A. This vertical rod $B^2$ at its lower end sets into a post, $C^2$, of a treadle, $C^3$, and is adjustable in length therein, and as so adjusted secured with set-screw $k$. The upper end, $B^3$, of this rod $B^2$ is made of a hook shape, and the rod has an up-and-down adjustable collar, $B^4$, which is secured by a set-screw, $l$, to it, and it has a side hook or dog, $B^5$.

To make a gange or snood in accordance with this invention, using mechanism such as above described, in combination with the ordinary and take-up mechanisms of a braiding-machine, proceed as follows: First, place the shank or stem J of the hook K to have a gange or snood attached to it through the slit $b$ of the platform R and enter it between the jaws of the clamp, which then tightly close upon it, taking care that the eye $d$ of the hook is at the braiding-point A of the braiding-machine (not particularly shown) and that the curved end or hook proper, K, stands across the gripping-surfaces of the clamp, Fig. 1. Now, take one half of the strands which the machine is to braid and those upon the same side of the machine and enter them at one side of the eye of the so clamped hook into and through said eye, and catch them upon the hook $B^3$ at the upper end of the vertical rod $B^2$, then at or about an inch and a half below said eye of the hook, and repeat this with the other half of the strands, but entering them, however, into the eye of the hook on the opposite side, Fig. 1. Now take up the slack in the strap D, connecting the clamp G with the take-up mechanism, and set the braiding and take-up mechanisms into operation, braiding about and around the strands so extended downward from the eye of the hook to the hooked end $B^3$ of the rod $B^2$, and when sufficiently so braided to make said strands secure, having first stopped the machine, cut and thus detach them from said hooked end and proceed with the braiding. As the braiding proceeds the take-up pulley C takes it up, and having secured the desired length of braided gange or snood, (see Fig. 2,) stop the machine, bring the braiding end $f$ of the arm W across the slit of the platform R, and in front of the braided gange, (see Figs. 4 and 6,) and, releasing the clamp G, take the fish-hook from it and bend the so braided length of gange over the upper and front edges of said bridging-piece $f$, and catch the hook of the fish-hook on the hook or dog $B^5$ of the collar $B^4$ of the vertical rod $B^2$, suitably adjusted in height therefor, and for then holding the braided gange so doubled over at a tension, and proceed with the braiding, which then takes place over and around the so bent-down braided gange until suitable connection is secured and a loop, $C^2$, formed in the braided gange, Fig. 4. Now stop the machine and remove the braided gange and place it by its loop $C^2$, just previously made in the operation of the braiding-machine, upon the hook end $h$ of the arm W, first having properly swung said arm therefor, and, having placed another fish-hook in the clamp-jaws, cut first one half and then the other half of the strands from the so suspended loop $C^2$ and place them in turn in the eye of the hook and attach them to the hooked end of the vertical rod, all as before described, and proceed as before, removing, after the strands have been cut and connected, as stated, the previously-completed gange from the machine. (See Fig. 5.)

$D^3$, Fig. 7, is a swivel-eye suspended by its eye from the loop $C^2$ of the gange. If the eye of the swivel is too small to allow it to be passed over the eye of the fish-hook, the eye of the swivel is then placed horizontally under the eye of the fish-hook and the strands passed, as has been stated, in halves, each half first up through the eye of the swivel, then through the eye of the fish-hook and down through the eye of the swivel to the hooked end $B^3$ of the vertical rod $B^2$, as described, and when the desired length of gange is completed bend said gange over the edge of the bridge-piece of the arm, then in position therefor, and over the edge of the eye of the swivel, and thus in the continued braiding of the machine said swivel is secured in the loop $C^2$ of the gange then so formed. If the eye of the swivel is large enough to pass over the eye of the hook, it may be placed in position to be secured to the gange, as stated, after the braiding of the desired length of gange is completed.

The gange or snood herein described may be made without the application of the fish-hook, using an eye or some other device about which to bend the strands to be braided. Again, the making of the loop $C^2$ of the gange may be dispensed with and the gange may be used for other purposes than that particularly described.

In lieu of making the bridge-piece $f$ and hook $h$ on one arm, W, they may be on separate arms.

Having thus described my invention, I claim—

1. A gange or snood composed of separate strands at one end severally doubled or folded to form a loop or eye, and fastened in such loop form by a braid of the strands lengthwise around them, and which is continued for the desired length of snood, substantially as described.

2. A gange or snood composed of separate strands at one end severally doubled or folded to form a loop or eye, and fastened in such loop form by a braid of the strands lengthwise around them, and which is continued for the desired length of snood, and the strands at that end severally bent or doubled, and braided around said braided length of strands, and so braided and secured, substantially as described.

In testimony whereof I have hereunto set my hand in the presence of two subscribing witnesses.

H. H. MANSFIELD.

Witnesses:
WM. S. BELLOWS,
ALBERT W. BROWN.